United States Patent [19]

Scheffel et al.

[11] 4,294,482

[45] Oct. 13, 1981

[54] RAILWAY WHEEL TREAD PROFILE

[75] Inventors: Herbert Scheffel; Rowlen E. von Gericke; Joseph A. Viviers, all of Transvaal, South Africa

[73] Assignee: South African Inventions Development Corporation, Transvaal, South Africa

[21] Appl. No.: 69,515

[22] Filed: Aug. 23, 1979

[30] Foreign Application Priority Data

Aug. 23, 1978 [ZA] South Africa ............... 78/4791

[51] Int. Cl.³ ............................................ B60B 17/00
[52] U.S. Cl. .................................... 295/34; 295/31 R
[58] Field of Search .............................. 295/31 R–34; 238/148

[56] References Cited

U.S. PATENT DOCUMENTS

| | | | |
|---|---|---|---|
| 412,937 | 10/1889 | Swinerton | 295/34 |
| 994,350 | 6/1911 | Vial | 295/34 |
| 1,293,628 | 2/1919 | Coda | 295/34 |
| 1,783,705 | 12/1930 | Emerson et al. | 295/34 |
| 2,052,660 | 9/1936 | Rogard | 295/34 X |
| 4,026,217 | 5/1977 | Cross et al. | 295/34 X |

FOREIGN PATENT DOCUMENTS

| | | | |
|---|---|---|---|
| 8538 | 3/1980 | European Pat. Off. | 295/33 |
| 862458 | 1/1953 | Fed. Rep. of Germany | 295/34 |
| 500624 | 2/1939 | United Kingdom | 295/34 |

Primary Examiner—Randolph A. Reese
Attorney, Agent, or Firm—Schwartz, Jeffery, Schwaab, Mack, Blumenthal & Koch

[57] ABSTRACT

A profiled wheel tread for use with self-steering wheelsets, the tread having a running surface, a wheel flange, a taping line passing through the running surface, and a running zone between the taping line and the wheel flange. The invention provides that the effective conicity across the running zone being the rate of increase of rolling diameter decreases from the taping line towards the wheel flange. In another form the effective conicity initially increases from the taping line, reaches a maximum at a lateral deflection of between 1.5 and 4 mm, and then decreases towards the wheel flange. The wheel flange is thinner than normal to increase the gauge clearance. Improvements are thereby obtained in wheel tread wear and rail wear by minimizing creep forces; in hunting stability, because the effective conicity at maximum lateral deflection is low; and in steering ability, because of a high average conicity and increased gauge clearance.

19 Claims, 8 Drawing Figures

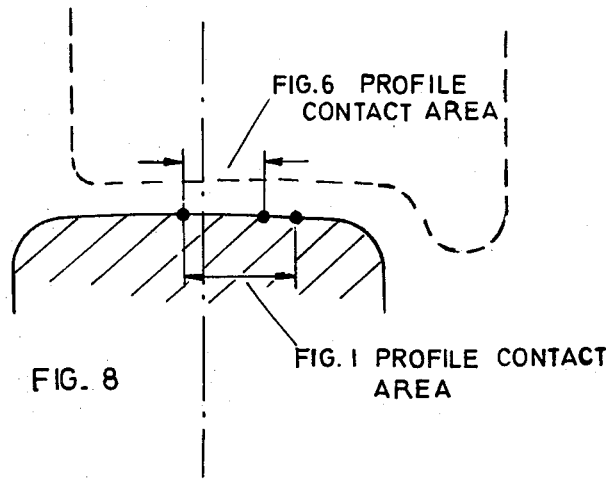
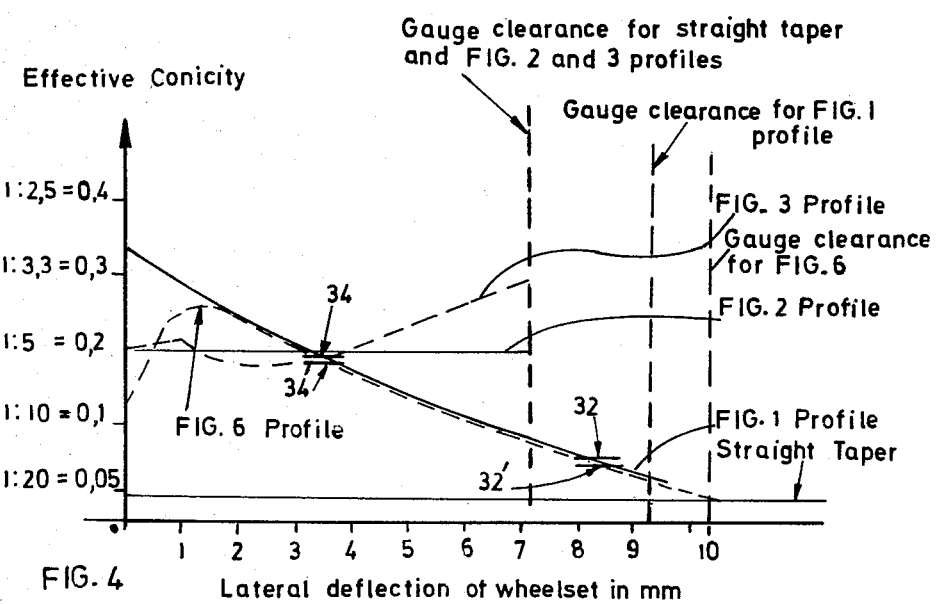

RAILWAY WHEEL TREAD PROFILE

BACKGROUND TO THE INVENTION

This invention relates to a railway wheel tread-profile.

In a railway vehicle design two main factors have to be considered. The first is the dynamic stability of the vehicle at various speeds throughout its operating speed range. The various vehicle masses, such as body, bogies, and wheelsets each of which comprises a pair of wheels solidly mounted on an axle, experience oscillations known in the art as "hunting". The maximum speed of the vehicle or critical speed is determined by the onset of unstable, undesirable wheelset hunting. This hunting is caused by the combination and resonance of the hunting caused in the wheelsets by their resilient suspension to the other vehicle masses and by the creep forces generated by the conical wheel treads on the rails. The hunting caused by creep forces is speed dependent. Increasing the conicity of the wheel-treads increases the creep forces causing hunting and therefore lowers the critical speed of the vehicle. The second factor is the ability of the vehicle to negotiate track curves. This curving ability is determined primarily by the ability of the wheelsets to follow the track curves. Optimally the wheelsets should perform a purely rolling motion in track curves without any contact between the wheel flanges and the rails. This requires steering forces to be generated by the conical wheel tread independently of the wheel flange and a suspension permitting the wheelset to yaw, i.e. rotate about a vertical axis through its center of gravity, to approach a radial position with respect to the track curves. Increasing the wheel-tread conicity improves the steering ability of the wheelsets because of the increased steering forces thereby generated within the limited gauge clearances (distance between wheel flange and track) available. Therefore, with regard to the conicity of the wheel-treads, there is a conflict between the requirements for hunting stability and increased vehicle speed and for a good curving ability of the wheelsets. For this reason conventional railway vehicles use a wheel-tread with a straight taper of the order of 1 in 20 as a compromise solution. A taper or conicity of 1 in 40 has also been used on special track. A problem with this approach is, however, that in service the wheel-treads wear which changes the effective conicity of the wheel treads so that hunting stability cannot be maintained in service.

In order to overcome the abovementioned difficulties it has been proposed to make the wheelsets self-steering by providing them with a high effective conicity to generate steering forces and by suspending the wheelsets to the other vehicle masses in such a manner that the wheelsets can yaw to assume a radial position in track curves. The increased tendency to hunting caused by making the wheelsets self-steering is counteracted by coupling the wheelsets in opposite senses which, ultimately, generates hunting stabilizing creep forces in the wheel/rail contact areas. This approach is outlined in U.S. Pat. No. 4,067,261. Moreover with this approach profiled wheel-treads are used, i.e. they do not have a straight taper, so that the profile does not change significantly with wear and hunting stability is retained in service.

With a conical (straight taper) wheel-tread the conicity remains virtually constant with lateral deflection of the wheelset relative to the track. In other words the conicity remains the same irrespective of whether the wheel runs centrally on the track or is deflected closer to one rail. If profiled wheel-treads are used, i.e. the running surface is formed of arcs or parts of a circle, then the radius of these arcs must be greater than the radius of the rail head and also, as a consequence, the effective conicity of the running tread will be greater than the inclination of the rail to the vertical. The effective conicity is given as an approximation by the following relation for wheel treads, the running zone of which is formed of a single arc:

$$\gamma \approx \frac{R_w \cdot \delta_o}{R_w - R_R}$$

where:
$\gamma$ is effective conicity,
$\delta_o$ is angle the rail is inclined to the vertical
$R_w$ is radius of the wheel-tread, and
$R_r$ is the radius of the rail-head.

In the art the term "profiled" is used in relation to wheels having a curved running zone and distinguishes such wheels from conventional wheels having a linear tread. With linear treads there is a linear change in rolling diameter as the wheel moves laterally on the rail and the taper formed on the tread defines this change. Since the tread has the form of a truncated cone this taper is referred to as "conicity". With profiled wheels, however, the curvature or tread profile, the rail-head radius, and rail inclination result in non-linear diameter changes and non-linear lateral changes in wheel/rail contact points on the field side of one wheel and the gauge side of the other for unit linear lateral movements of the wheelset (e.g. see FIG. 7 of the drawings). Thus, the change in rolling diameter per unit lateral movement of the wheelset is no longer linear, but the conical effect remains. For this reason and because profiled wheels are not strictly speaking conical, the term "effective conicity" is used in relation to such profiled treads. The relation given above is an approximation given by Wickens in a paper entitled "The Dynamics of Railway Vehicles on Straight Track; Fundamental Considerations of Lateral Stability", Proc. Inst. of Eng. 1965, Vol. 180 on page 4 equation 1.5, for a special case of profiled tread as stated, and is not applicable to wheels where the profile is not a single arc. A general definition of conicity that applies to linear and non-linear tread forms is that it is one-half the sum of the changes in rolling radius of the two wheels of a wheelset divided by the lateral deflection of the wheelset on the rails. This definition may be used to give a clearer picture of what effect the shape or profile of the running zone—as seen in a typical drawing—has on conicity or effective conicity. With straight taper wheel treads, the conicity is constant. With prior art type treads formed of an arc of constant radius, e.g. West German Pat. No. 862,458 the rolling diameter increases with lateral deflection and in use on a rail with a radiussed head the rate of increase of rolling diameter is substantially constant. The effect is a substantially constant effective conicity and one which is obviously higher than a straight taper. With "worn wheel" type prior art treads, the arc radius of the tread profile curve decreases (i.e. the curvature increases) towards the wheel flange so that in use the rate of change of rolling diameter increases with increasing lateral displacement. This has the effect of increasing the effective conicity progressively towards the wheel flange. The shape of a very worn wheel, e.g. U.S. Pat. No. 1,783,706 Emerson et al, which has a "hollow" profile must also be considered. The main characteristic of this profile is that there is portion of the running zone in which the rolling diameter in fact decreases with lateral displacement. This results in a negative effective conicity in this zone, i.e. the rate of change of rolling diameter becomes negative or less than zero in this zone. This negative conicity exists provided that contact of the wheel with the rail is maintained in this zone; if this is not so then there is an undesirable cut-off of the conicity. These previously mentioned "rates of change" will be evident to the eye on inspection of a longitudinal section through a wheel tread, e.g. as shown in the attached drawings. It has been found that such a progressively increasing conicity lowers the hunting stability of the wheelset as the wheelset appears to respond to the highest conicity which prevails when the wheelset is furthest deflected.

A further factor which must be considered in designing a wheel-tread is the wearing characteristic resulting from the form of the tread itself without consideration of the materials used for the wheel and rail. Contrary to normal expectations that an increase in contact area would necessarily decrease tread wear, research has now shown that the rate of wear of the tread can, in fact, increase when the shape of the tread approaches the shape of the rail head. This is because the wheel-tread/rail-head contact area increases to such an extent that there is a disadvantageous increase of the creep forces or slip of the wheel on the rail which in turn increases the wear rate significantly and more than offsets the expected reduction of wear rate due to the increase of contact area. This follows since there is a differential in rolling diameters between parts of the contact area of the same wheel.

"Taping line" is a term used in the art to denote the contact point on the wheel-tread when the wheelset is in its central position. In practice on the side of the taping line remote from the wheel flange, often referred to in the art as the "field side", the tread normally, but not essentially, has a straight taper of a suitable conicity which is the same as the inclination of the rail, such as 1:20 or 1:40 as used in practice, while on the other side of the taping line, often referred to as the "gauge side", the tread is concave. On lateral deflection of the wheelset the combined effect of one wheel on the straight tapered portion and the other wheel on the concave portion provides the prevailing conicity for the wheel-tread at the particular lateral deflection and this is referred to as the "effective conicity" at that deflection.

It is therefore an object of this invention to provide a profile for a railway wheel tread which ameliorates the conflict between curving ability and hunting stability mentioned above. In a development, this invention also seeks to provide such a profile that wheel tread wear is minimised.

SUMMARY OF THE INVENTION

According to the invention a profiled wheel-tread for a railway wheel having a circumferential running surface and a circumferential wheel flange with the running surface having a taping line and a running zone between the taping line and the wheel flange has the improvement that the effective conicity across the running zone decreases from a zone adjacent the taping line towards the wheel flange. As will be explained below the effective conicity has a "drooping" characteristic with increasing lateral deflection of the wheelset with respect to the track. This decreasing effective conicity is obtained by making the curvature of the running zone decrease towards the wheel flange except for the region immediately adjacent the flange where there is a relatively sharply radiussed fillet merging the running zone with the wheel flange.

Preferably, for ease of manufacture the running zone is formed of a series of smoothly merging arcs the radii of which increase across the running zone from a zone adjacent the taping line towards the wheel flange. Furthermore, the centers of the radii of the arcs of the running zone in the region of decreasing effective conicity in relation to a plane normal to the rotational axis of the wheel and passing through the wheel flange may be at the greatest distance from this plane for the arcs of longest radii and closest to this plane for the arcs of shortest radii.

Also according to the invention the thickness of the wheel flange is made less than is conventional to increase the gauge clearance. This is practicable when using the profile of the invention with self-steering wheelsets since there will be insignificant wheel flange wear as wheel flange/rail contact is not required for steering. Also the thinner flange and increased gauge clearance permits the wheelset to attain greater yaw angles than wheelsets having prior art tread shapes.

In one form of the invention the effective conicity of the wheel-tread decreases from the taping line towards the wheel flange. The initial conicity is preferably between 1:2 and 1:5 and suitably between 1:2.5 and 1:4 while the conicity at maximum deflection is approximately or just less than 1:20. For hunting stability the wheelset appears to respond to the conicity that prevails when the wheelset approaches its maximum lateral deflection and is between 1:20 and 1:10 and optimally between 1:13 and 1:20. For curving ability, the wheelset appears to respond to the "average" conicity. Suitably this average conicity is between 1:3 and 1:8 and preferably about 1:5 or between 1:4 and 1:6.

In a development of the invention to increase the wear characteristics of the tread by minimising the wheel-tread/rail contact area near the top of the rail and thereby the creep forces in this region, the invention provides the further improvement that adjacent the taping line and between the taping line and the wheel flange the effective conicity initially increases and then decreases. Preferably adjacent the taping line the conicity is between 1:5 and 1:10, which then increases to between 1:3 and 1:5 at a lateral deflection of between 1.0 and 4 mm from the taping line, and the decreases to 1:20 at maximum lateral deflection. The effective conicity is, preferably, initially between 1:7 and 1:9, increases to between 1:3 and 1:4 at a lateral deflection of between 1.5 and 2.5 mm, and then decreases.

Further features and advantages of the invention will become apparent from the following description made with reference to the accompanying schematic drawings.

BRIEF DESCRIPTION OF THE DRAWINGS

FIG. 4 shows a graph of effective conicity of a wheel-tread with lateral deflection of the wheelset for wheel profiles according to FIGS. 1 to 3 of the drawings and for a conical wheel-tread;

FIG. 8 shows schematically the contact areas of the tread with the rail head of the profiles of FIGS. 1 and 6.

DESCRIPTION OF EMBODIMENTS OF THE INVENTION

Figure 1:
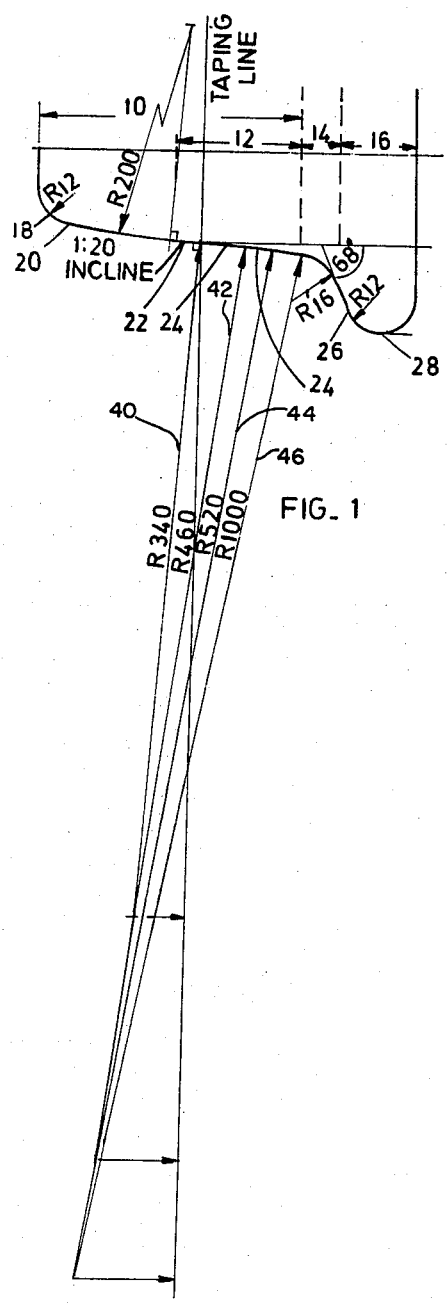
FIG. 1 shows a wheel-tread profile according to the present invention.

In the drawings the same or similar parts have been given the same reference numerals.

FIG. 1 shows a wheel-tread profile according to the invention. In this figure the profile includes a running surface 10 including a running zone 12, a wheel flange portion 16, and a radiussed fillet portion 14 merging the flange portion 16 with the running surface 10. Also in this drawing typical dimensions have been given, but these are for a particular railway vehicle running on particular track and should be regarded as being illustrative and not limiting. Now starting from the left hand side of the drawing and in greater detail, the running surface 10 includes a radiussed corner 18, a convex portion 20 of large radius, a short straight portion 22 having a taper of 1:20, a plurality of smoothly merging arcs 24 of increasing radius 40, 42, 44 and 46 between the straight tapered portion 22 and the fillet radius 14, the fillet radius 14 itself, a sharply tapered portion 26 at 68° to the rotational axis of the wheel leading to the periphery of the wheel flange 16 and the periphery 28 of the wheel flange itself formed of a sharply radiussed portion.

As illustrated in the drawings the radii 40 to 46 of the arcs forming the running surface 12 increase across the tread towards the fillet radius, which must of necessity be smaller than the radii of the running zone and be compatible with but not the same as the gauge corner radius of the rail. The effective conicity of this FIG. 1 profile is illustrated in FIG. 4 and wherein the effective conicity decreases with increasing lateral deflection. As can be seen from the drawings the rolling diameter increases progressively in the running zone towards the wheel flange with the rate of change of this increase decreasing but never becoming zero or negative.

It has been found that a wheelset having a drooping wheel-tread conicity, e.g. see the relevant curve of this profile in FIG. 4, responds for hunting as if the conicity was closer to the lower conicity. In other words the conicity that prevails near the maximum deflection of the wheel-tread greatly determines the hunting characteristic of the wheel-tread. Since the effective conicity at maximum deflection is very low, the creep forces inducing hunting are low, the wheelset hunting stability is high, and the maximum critical speed of the wheelset is increased using the wheel profile of FIG. 1.

On the other hand for curving it has been found that the conicity determining the steering forces is the "average conicity" which is higher than the effective conicity for hunting stability purposes. Therefore, a wheel provided with a profile of the invention retains the good curving characteristics associated with profiled wheel treads. For illustrative purposes the approximate effective conicity for hunting purposes has been illustrated in FIG. 4 at 32, i.e. approximately 1:14, while the approximate average conicity for curving purposes is illustrated at 34, i.e. approximately 1:5 or between 1:7 and 1:4. As a linearised approximation the "average conicity" is one-half of the conicity at zero lateral deflection plus the conicity at maximum lateral deflection.

The difference between the average conicity 34 for steering purposes and the effective conicity 32 for hunting stability purposes is further increased by using a flange which is thinner than normal as is done in the embodiment of FIG. 1. For example normally the flange is about 30 mm thick, while the profile of the invention uses a flange which is about 25 mm thick; this increases the gauge clearance. This is made possible using self-steering wheelsets as there is an absence of flange wear so that wheel life is not reduced if a thinner flange is being used.

Figure 5:
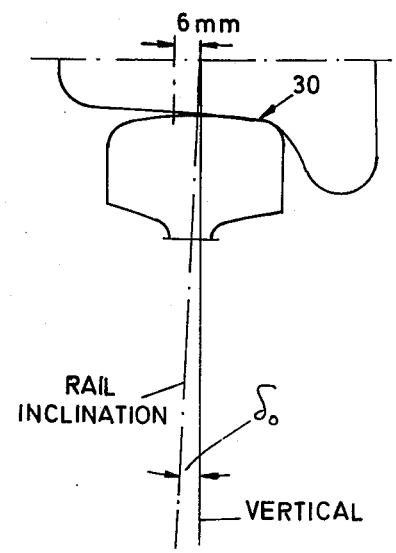
FIG. 5 shows the interaction of a wheel-tread with a rail head for a profiled tread when the wheelset is deflected laterally.

In practice, the lateral deflection of known wheel treads on the track is a maximum of about 6 mm when wheel flange/rail head contact occurs. However, since the rail head is curved and the running zone is also curved the contact point between the rail head and the running zone varies to a greater extent. This is illustrated in FIG. 5 where the deflection of the wheelset on the track is about 6 mm, while the contact point between the wheel and the rail is shown at 30 and is considerably more displaced from the "taping line" than is the actual displacement of the wheelset with respect to the rail head. With the profile of FIG. 1 the gauge clearance is about 9.3 mm. FIG. 5 also illustrates the inclination of the rail to the vertical denoted $\delta_o$ and which has been mentioned previously.

Figure 3:
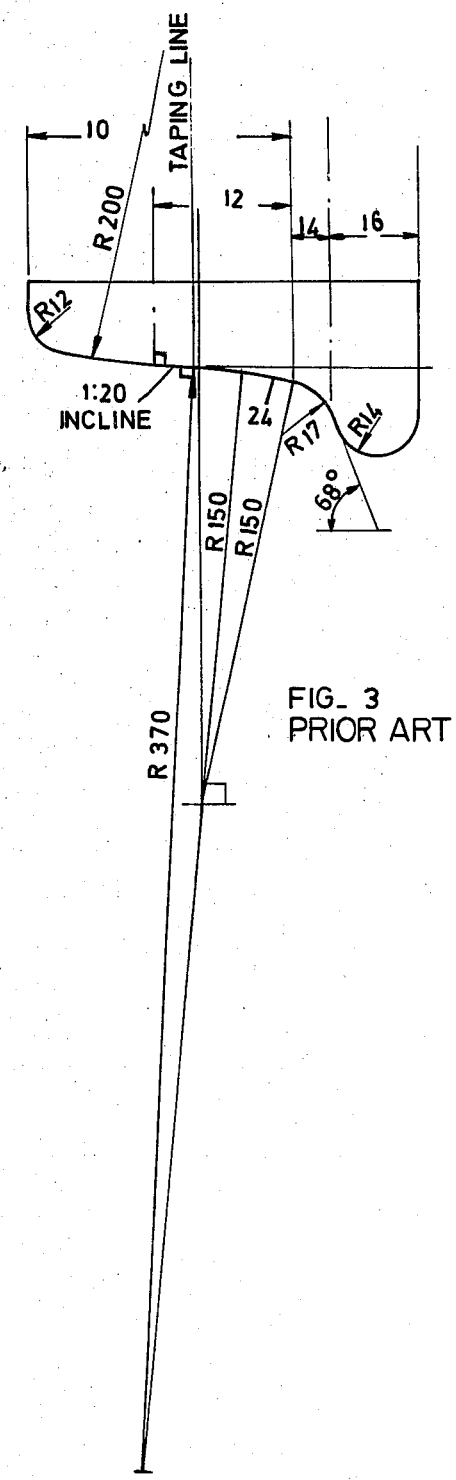
FIG. 3 shows a wheel-tread profile formed with a running zone formed of arcs of decreasing radius across the running zone towards the wheel flange.
Figure 2:
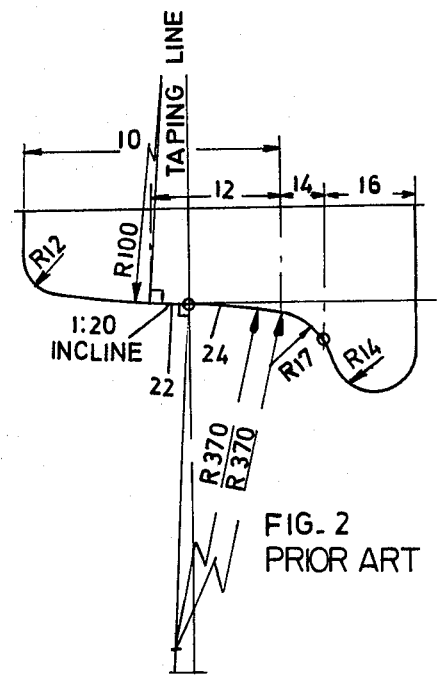
FIG. 2 shows a prior art wheel-tread profile with a running zone formed of an arc of constant radius.

In order to distinguish the profile of the present invention from prior art wheel profiles reference is now made to FIGS. 2 and 3. FIG. 2 shows a prior art profile in which the running zone 12 is formed with a field side straight taper 22 of 1:20 conicity and a concavely curved portion 24 formed of an arc of constant radius. This is also shown in West German Pat. No. 862,458. The effective conicity of this profile remains substantially constant on lateral deflection of the wheelset with respect to the track as illustrated in FIG. 4. With this profile the effective conicity for hunting purposes and for curving purposes is substantially the same. Clearly, the rate of increase of rolling diameter is substantially constant.

FIG. 3 illustrates a profile in which the curved portion 24 of the running zone 12 is formed of arcs of radius decreasing towards the wheel flange portion 16. This wheel profile has an effective conicity that increases with increasing lateral displacement of the wheelset on the track. It can be seen that rolling diameter increases progressively more rapidly towards the flange. This is illustrated in FIG. 4. The effect of such a progressively increasing conicity lowers the hunting stability of the wheelset as the wheelset appears to respond to the highest conicity which prevails when the wheelset is furthest deflected. As will be appreciated from the conicity curve of this wheel profile in FIG. 4 the effective conicity for hunting stability purposes is very high so that the wheelset will experience unstable hunting at a relatively low critical speed. The steering ability of this wheel which is determined to a large extent by the average conicity is much lower than that prevailing for hunting stability purposes. This profile is similar to that known in the art as a "standard wear" profile, which is the profile assumed by naturally worn wheels of conventional railway vehicles not having self-steering wheelsets.

Also the profile of the invention differs from that of worn wheels of a railway vehicle with self-steering wheelsets where the initial profile had a constant curvature across the running zone, shown for example in FIG. 3. Such worn wheel-treads, because nearly all the wear occurs near the zero lateral deflection region of the running zone 24, have an increased conicity near the zero lateral deflection region and a substantially constant conicity across the remainder of the running zone 24. Such worn wheels do not improve the performance of the vehicle, since the increased conicity is not required for steering, while the constant (and relatively high) "effective conicity" determining the hunting stability performance remains unchanged.

Figure 6:
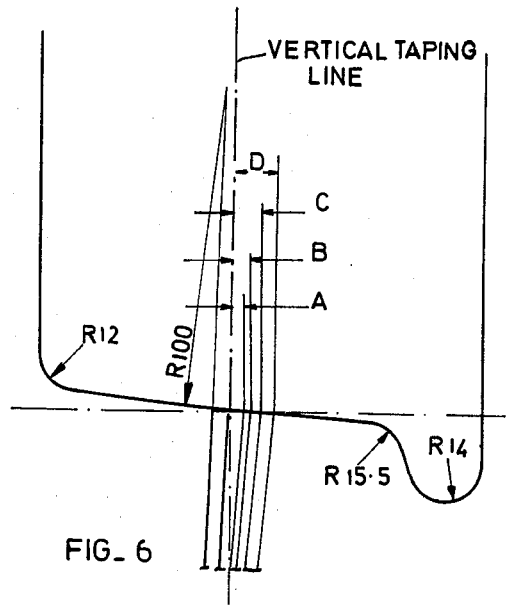
FIG. 6 shows another wheel-tread profile of the invention which is a development of the profile shown in FIG. 1.
Figure 7:
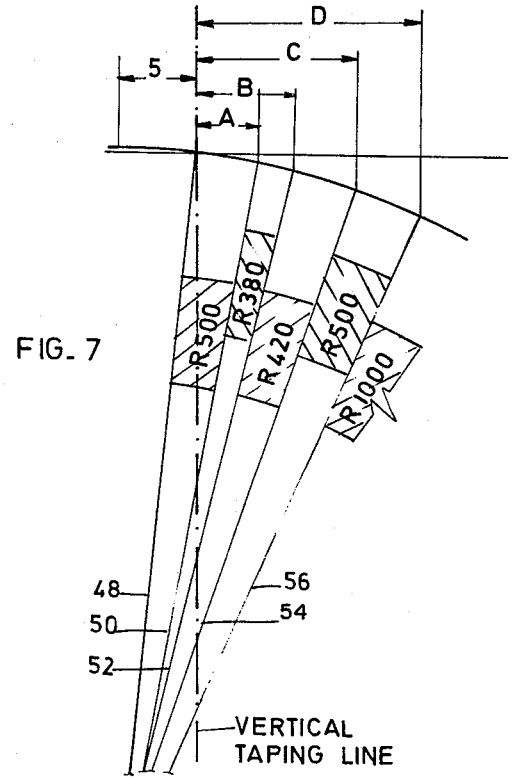
FIG. 7 shows an enlarged, schematic detail of the tread profile of FIG. 6.

FIGS. 6 and 7 show a development of the profile of the invention shown in FIG. 1. In this event while the drooping effective conicity is maintained, this droop starts from a position slightly displaced from the taping line. Between the taping line and the start of the droop the conicity increases slightly while the conicity at zero deflection is decreased as shown in FIG. 4. These characteristics are obtained by forming the running zone 12 (starting from the left hand side of the drawing) with a straight taper at 22 of 1:20, in this case to suit a rail inclination of 1:20, forming an arc 48 of a predetermined radius (500 mm), merging this arc 48 with an arc 50 of smaller radius (380 mm) and then forming further arcs 52, 54 and 56 that merge with each other and increase in radius towards the wheel flange (420, 500, 1000 mm). The net effect of the field side taper of 1:20 and the arcs 52 to 56 provides a drooping effective conicity for this profile which is about the same as that of FIG. 1. In performance this profile has substantially the same hunting stability characteristics as that of FIG. 1 because the effective conicity near maximum deflection for hunting considerations is at 32′ which is near 32. However, the effective conicity for steering purposes is initially lower than that of FIG. 1, then increases and then decreases. The net effect is that the average conicity for curving purposes is slightly lower than that of FIG. 1. This, however, depending on track conditions such as the sharpest curves to be negotiated can be compensated for by increasing the gauge clearance (by making the flange thinner, as shown in FIG. 4 to be about 10.3 mm.) Note that although effective conicity initially increases then decreases it is always positive and never becomes negative as occurs with hollow worn treads. In other words the rolling diameter always increases towards the flange, but at different rates.

A further advantage of using the profiles of FIGS. 1 and 6 is that wheel loading is removed from the gauge corner of the rail because of the high effective conicity for steering purposes, such as at 32 and 32′, the increasing tread radius shape, and the increased gauge clearance obtained by using a thinner flange.

Another advantage of the profile of the invention is that there will be a decrease of tread and rail wear near the top of the rail and near the taping line of the wheel. FIG. 8 shows schematically the relative extents of the tread/rail contact areas for the profiles of FIGS. 1 and 6. As can be seen the contact area for the FIG. 6 profile is less than that for the FIG. 1 profile because of the initially increasing and then drooping effective conicity characteristic. Such contact areas are considerably smaller than those for the profiles of FIGS. 2 and 3.

It is to be understood that the discussion of specific embodiments above is to be regarded as illustrative and not as limiting the scope of the invention as set out in the appended claims.

We claim:

1. A profiled wheel-tread for a railway wheel having a circumferential running surface and a circumferential wheel flange with the running surface having a taping line and a running zone between the taping line and a radiussed fillet portion at the base of the wheel flange with the improvement that the effective conicity across the running zone, the effective conicity being dependent on the rate of change of rolling diameter, decreases progressively while remaining positive from a zone adjacent the taping line towards the wheel flange.

2. A profiled wheel-tread as claimed in claim 1, in which the running zone is formed of a series of smoothly merging arcs the radii of which increase across the running zone from a zone adjacent the taping line towards the wheel flange.

3. A profiled wheel-tread as claimed in claim 2, in which the centres of the radii of the arcs of the running zone in relation to a plane normal to the rotational axis of the wheel and passing through the wheel flange are at the greatest distance from this plane for the arcs longest radius and are closest to this plane for the arcs of which are of shortest radius.

4. A profiled wheel-tread as claimed in claim 2 in which the centres of the radii of the arcs are on the side of the taping line remote from the wheel flange.

5. A profiled wheel-tread as claimed in claim 4, in which the initial effective conicity at the taping line is between 1:2 and 1:5.

6. A profiled wheel-tread as claimed in claim 4, in which the initial effective conicity at the taping line is between 1:2.5 and 1:4.

7. A profiled wheel-tread as claimed in claim 4, in which the average effective conicity, being one-half of the effective conicity at zero lateral deflection plus one-half the effective conicity at maximum lateral deflection, is between 1:3 and 1:8.

8. A profiled wheel-tread as claimed in claim 1, in which the effective conicity across the running zone decreases from the taping line towards the wheel flange.

9. A profiled wheel-tread as claimed in claim 1, in which the effective conicity of the wheel-tread at maximum lateral deflection is less than 1:15.

10. A profiled wheel-tread as claimed in claim 1, in which the effective conicity initially increases from the taping line towards the wheel flange, reaches a predetermined maximum value, and then decreases towards the wheel flange, the effective conicity always remaining positive in that the rolling diameter always increases towards the wheel flange.

11. A profiled wheel-tread as claimed in claim 10, in which the maximum effective conicity occurs in a region spaced between 1.0 and 4 mm from the taping line.

12. A profiled wheel-tread as claimed in claim 10, in which the maximum effective conicity occurs in a region spaced between 1.5 and 2.5 mm from the taping line.

13. A profiled wheel tread as claimed in claim 1, in which the initial effective conicity at the taping line is between 1:5 and 1:10, then increases to an effective conicity between 1:3 and 1:5, and then decreases to an effective conicity of less than 1:15.

14. A railway wheel having a circumferential running surface and a wheel flange with the running surface having a taping line and a running zone of wheel diameter increasing continuously towards the wheel flange between the taping line and a radiussed fillet zone merging the running zone with the wheel flange, the running zone in cross-section being a curve of smoothly merging arcs having their centres of curvature outside the wheel and having radii that increase in length progressively from a zone adjacent the taping line towards the flange.

15. A railway wheel as claimed in claim 14, in which the arc radii increase progressively from the taping line towards the wheel flange.

16. A railway wheel as claimed in claim 14, in which there is a predetermined arc radius in a region of the running zone contiguous with the taping line, in a successive region there is an arc of smaller radius, and then in successive regions approaching the wheel flange the arc radii increase in length continuously.

17. A railway wheel having a circumferential tread, a radial wheel flange and a radiussed fillet merging the tread with the flange, the tread including a taping line denoting the tread contact point with a rail when the wheel as one of a pair of wheels on an axle is running in a central, neutral position on the rail, the diameter of the wheel increasing continuously in the region of the tread from the taping line to the fillet with the rate of increase of diameter decreasing towards the fillet.

18. A railway wheel as claimed in claim 17, in which the tread on the field side of the taping line remote from the flange decreases in diameter.

19. A railway wheel as claimed in claim 18, in which tread on the field side initially decreases linearly and then decreases at a progressively increasing rate.

* * * * *